United States Patent Office 3,290,553
Patented Dec. 6, 1966

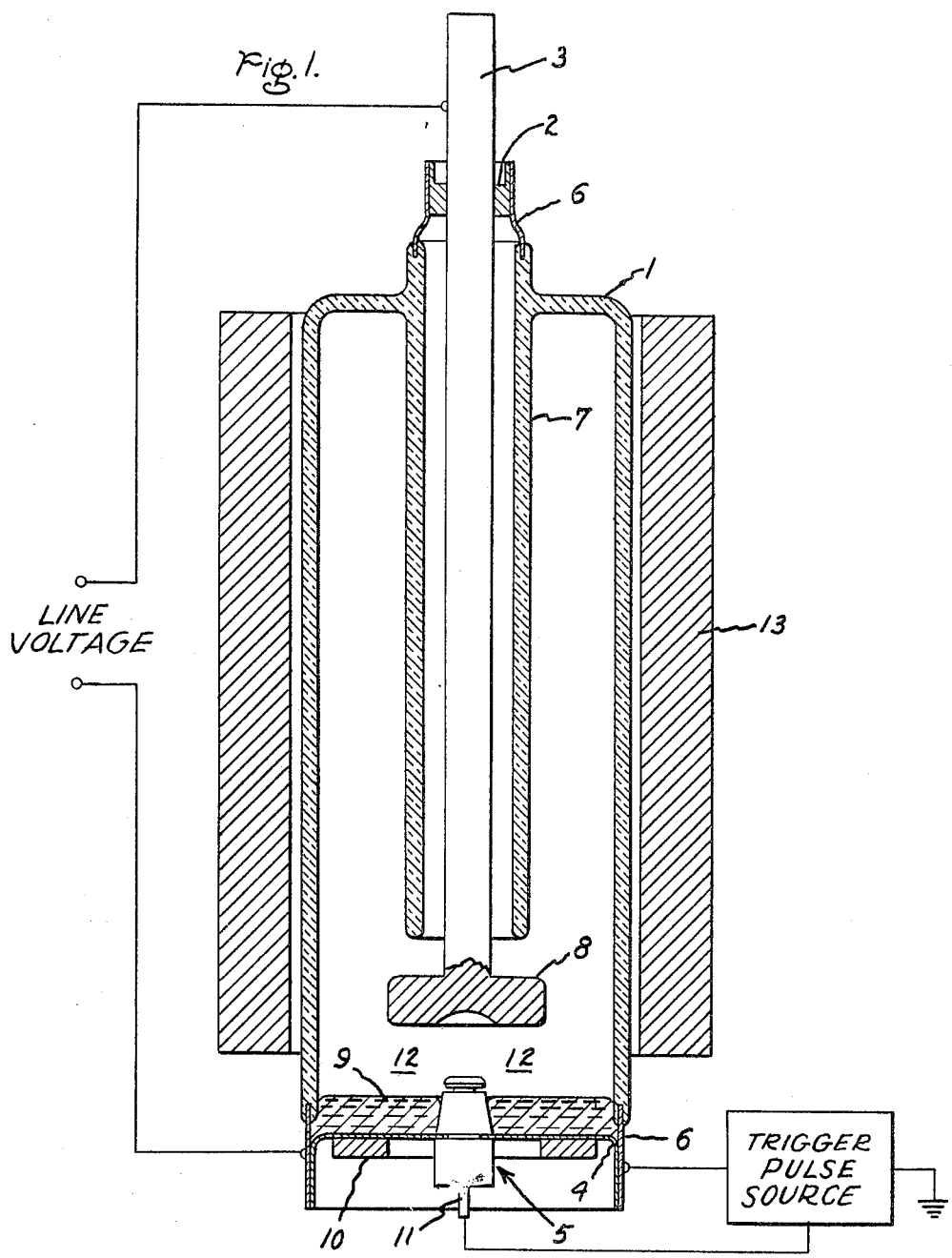

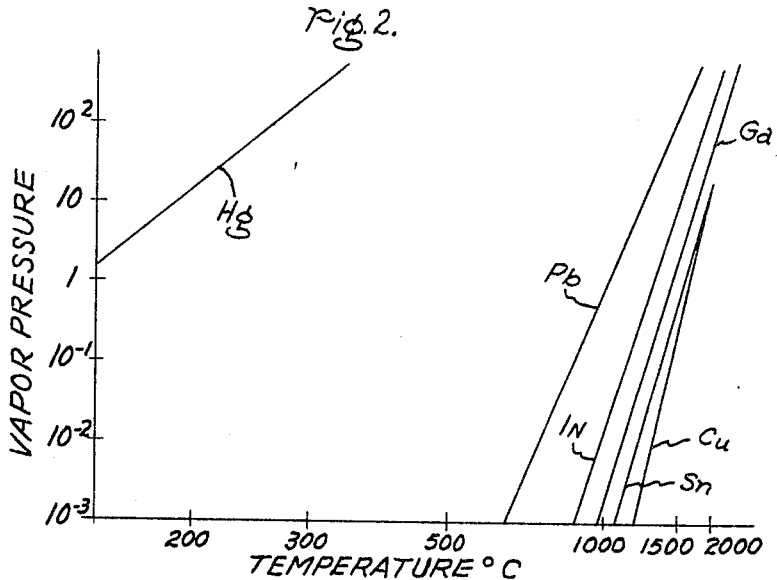
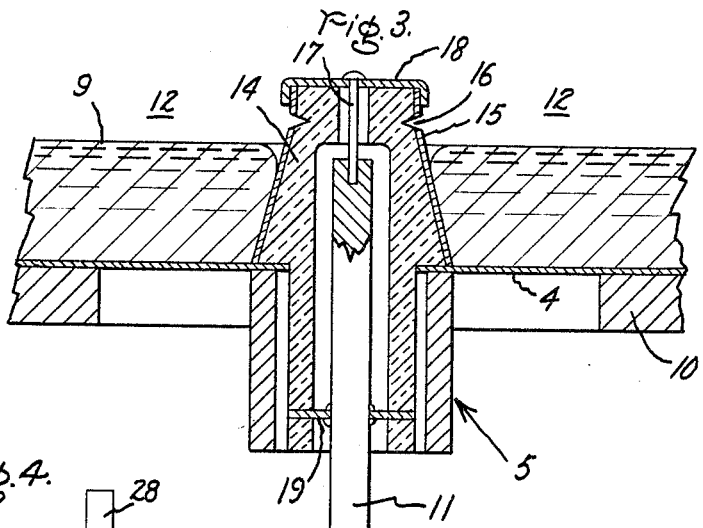
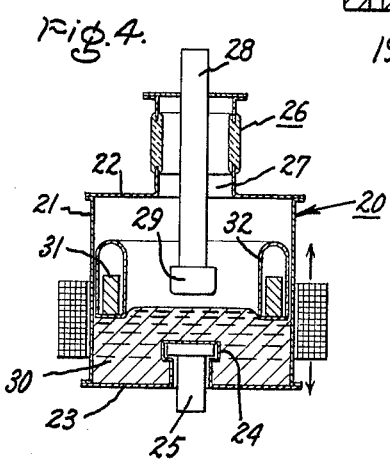
Inventor:
James M. Lafferty,
by John F. Ahern
His Attorney.

1

3,290,553
TRIGGERED VACUUM DISCHARGE DEVICE
HAVING A LIQUID CATHODE
James M. Lafferty, Schenectady, N.Y., assignor to General Electric Company, a corporation of New York
Filed Feb. 24, 1966, Ser. No. 529,790
9 Claims. (Cl. 315—115)

This application is a continuation-in-part of my copending application Serial No. 297,923, filed July 26, 1963, and assigned to the assignee of the present invention.

The present invention relates to electric gap discharge devices adapted to switch high voltages and currents by triggering electric breakdown between a pair of electrodes separated by a fixed or variable gap in vacuo and more particularly relates to an improvement thereof adapted for use over extended periods of time with alternating current.

In my U.S. Patent No. 3,087,092, issued April 23, 1963, entitled "Gas Generating Switching Tube," there is disclosed a triggered vacuum discharge device which comprises a pair of primary discharge electrodes, fabricated from gas-free metal, separated by a primary gap and disposed in a pressure of $10^{-5}$ millimeters of mercury or less. A trigger device, composed of gas-charged metal and having a gap across which a discharge is easily started, is provided to release and ionize gas from the metal and direct the ionized plasma so formed into the gap between the primary discharge electrodes to cause the primary gap to be broken down in the presence of a high voltage across the primary electrodes. When the primary discharge is terminated, the primary gap clears quickly due to diffusion and condensation of the electrode material and due to gettering of the ionized gas by the trigger metal so that the high dielectric strength of the original evacuated gap is reestablished rapidly. Until the trigger discharge is initiated again, the primary gap withstands very high voltages without breakdown.

In the utilization of such a device with alternating current, for example as a rectifier, erosion of the cathode electrode becomes a serious problem due to the repeated discharges which occur. One method of avoiding erosion difficulties in discharge devices is the use of a liquid such as mercury for the cathode. However, mercury has a relatively high vapor pressure and, therefore, prior art devices are of limited use, since the high vapor pressure within the device permits undesired breakdown if too high a voltage is applied across the primary gap. Furthermore, the devices of the prior art generally require high power to start a cathode spot from whence a discharge can be transferred to the anode of the device. Generating the cathode spot and transferring the discharge to the anode also requires a relatively long period of time.

It is therefore an object of the present invention to provide improved triggered vacuum gap discharge devices having an extending period of useful life.

A further object of the present invention is the provision of improved triggered vacuum gap discharge devices wherein the cathode material eroded during use is returned to its initial position.

A further object of the present invention is the provision of improved triggered vacuum gap discharge devices having a conductive liquid cathode which is adapted to withstand very high applied voltages.

Briefly, in accordance with one form of the present invention, an evacuated envelope encloses a pair of primary electrodes defining a primary discharge gap, either fixed or variable. One of the pair of primary electrodes comprises the cathode and comprises a liquid metal having a low vapor pressure, by virtue of which the device is adapted to withstand very high applied voltages. Triggering means are further provided for initiating a discharge which supplies the primary gap with charged particles to facilitate breakdown of the primary gap. In one embodiment of the invention, both primary electrodes are fixed to provide a fixed gap device. In another embodiment of the invention one primary electrode is moveable to define a variable, closeable gap device as for example a vacuum circuit interrupter or recloser.

The novel features believed characteristic of the invention are set forth in the appended claims. The invention itself, together with further objects and advantages thereof may best be understood by reference to the following description taken in connection with the appended drawings in which:

FIGURE 1 is a vertical cross-sectional view of a triggered vacuum discharge device constructed in accordance with the present invention;

FIGURE 2 is a graph illustrating vapor pressures of various elements used in conjunction with the present invention;

FIGURE 3 is a vertical cross-sectional view of a portion of the device of the present invention; and FIGURE 4 is a vertical cross-sectional view of an alternative embodiment of the invention wherein one primary electrode is moveable to define a variable gap.

In FIGURE 1, a triggered vacuum discharge device is shown utilizing one embodiment of the present invention. The device is enclosed by evacuated glass envelope 1 which, to insure proper operation of the device, is evacuated to a pressure of $10^{-5}$ mm. of mercury or less. The enclosure is hermetically sealed by metallic ring 2, anode lead 3, flanged metallic base disk 4, trigger device 5, and appropriate members 6 which are of a material to insure proper metal-to-glass seals, for example a Fernico alloy of 54% iron, 28% nickel, and 18% cobalt.

Envelope 1 is also provided with an inwardly depending re-entrant sleeve member 7 forming a shield for anode lead 3 within the envelope. Anode lead 3 supports one primary discharge electrode in close juxtaposition to the other; specifically, it supports anode 8 above cathode 9. Anode 8 comprises a saucered, solid cylindrically-shaped metallic member which may, for example, be fabricated from molybdenum. Lead 3 provides a terminal connection for anode 8.

Envelope 1 is represented herein as being composed of glass. This is not a necessary requirement, however. The envelope need be evacuable and impervious to gasses so as to maintain a hard vacuum therein. It, or portions thereof must be insulating, as for example of glass or ceramic so as to electrically isolate the main electrodes 8 and 9; otherwise great flexibility in materials choice obtains.

The cathode of the device comprises a pool 9 of liquid metal. Electrical connection to the cathode is supplied through connector 10 and disk 4. Trigger device 5, supplied with potential through base disk 4 and lead 11, serves the purpose, when pulsed, of filling primary discharge gap 12, defined by anode 8 and cathode 9, with a plasma of charged particles to enable the gap 12 to conduct. Trigger device 5 is preferably centrally located within gap 12.

Prior liquid cathode devices have used liquid mercury or a liquid mercury amalgam as the cathode metal. The vapor pressure of mercury at its melting point is $2 \times 10^{-6}$ mm. of Hg, and at room temperature this value rises to approximately $2 \times 10^{-3}$ mm. of Hg. When devices utilizing mercury as a liquid cathode or cathode constituent are used as rectifiers, the maximum voltage applied is limited since, during the negative half cycle, the mercury vapor present in the device can ionize under the influence of the electric field and cause conduction in the reverse direction which is, of course, undesired.

The triggering device 5 of the present invention supplies the only charged particles, in the form of an electron-ion plasma, necessary for breakdown of the discharge gap. The vapor of the cathode metal does not enter into the initiation of the primary discharge. Therefore, a significant feature of the present invention is a structure which permits the use of a liquid metal cathode having a very low vapor pressure. Because of the low vapor pressure, the device can be used with greatly increased voltages without danger of undesired breakdown. The primary gap can be maintained at a high degree of vacuum and breaks down only when the trigger device injects an appropriate pulse of charged particles in the form of an electron-ion plasma.

For operation at high voltages, where the present invention is most useful, the value of $10^{-7}$ mm. of mercury has been established as the value which the melting point vapor pressure of the liquid cathode should not exceed, although the true criteria is that the cathode material have a vapor pressure sufficiently low to allow for the establishment and maintenance of an equilibrium vacuum of $10^{-5}$ mm. of Hg at equilibrium operating temperature. Above this value, the vapor present within the device would allow the device to break down at relatively low voltages. Using a material having a vapor pressure not exceeding $10^{-7}$ mm. of mercury at the melting point temperature, the primary gap is maintained sufficiently evacuated to withstand very high operating voltages. Appropriate selection may be made to maintain the pressure within the device at a sufficiently low value.

The table given below presents examples of materials suitable for use with the device of the present invention, specifically gallium, indium, tin, thallium and lead, and for purposes of comparison, the corresponding properties of mercury, rubidium and copper, not suited are given.

TABLE 1

| Material | Melting Point (° C.) | Vapor Pressure at Melting Point (mm. of Hg) |
| --- | --- | --- |
| Ga | 37 | $8 \times 10^{-37}$ |
| In | 156 | $1 \times 10^{-21}$ |
| Sn | 232 | $1 \times 10^{-21}$ |
| Tl | 304 | $4 \times 10^{-8}$ |
| Pb | 328 | $5 \times 10^{-9}$ |
| Hg | −39 | $2 \times 10^{-6}$ |
| Rb | 39 | $1 \times 10^{-6}$ |
| Cu | 1,084 | $3 \times 10^{-4}$ |

It can easily be seen that gallium, indium, tin, thallium and lead have both significantly lower vapor pressures than other low melting point materials such as mercury and rubidium and have vapor pressures lower than $10^{-7}$ mm. of mercury. Of these it is also apparent that gallium, indium, and tin are many times better than the others.

FIGURE 2 shows the vapor pressures of some of these elements at high temperatures and it can easily be seen that the vapor pressures of Pb, In, Ga, and Sn do not differ significantly from that of copper, even in its solid state, while the mercury vapor pressure is much higher. In general, it appears that elements suitable for use as the cathode material in the present invention lie in groups IIIb and IVb of the periodic table.

In view of the phenomenon of reduction of vapor pressure upon mixture of two elements, in accord with Raoult's Law the following alloys may be preferred for use as the cathode material:

TABLE 2

| Alloy | Approximate Composition | Melting Point in ° C. |
| --- | --- | --- |
| Ga-In | 30% In | 16.5 |
| Ga-Sn | 8% Sn | 20 |
| Ga-Pb | 15 to 95% Pb | 317 |
| In-Sn | 48% Sn | 117 |
| Tl-Sn | 43.5% Tl | 170 |
| Sn-Pb | 61.9% Sn | 183 |

In view of the melting points given in the above tables, a heater 13 may be provided surrounding the discharge device and actuated at least until the first arcing in continuous cycle devices, as for example rectifiers, so that the temperature of the cathode is maintained sufficiently high to keep the cathode liquid. Heater 13 is preferably positioned such that the cathode is the coolest area of the device so that the cathode material will not tend to condense or collect in any other location. If a material, for example the 30% In-70% Ga alloy or the 8% Sn-92% Ga alloy, having a melting point less than room temperature is utilized, the heater 13 is not required. It is to be understood, however, that although specific materials have been enumerated, any conductive material which is liquid at the operating temperature and which has a sufficiently low melting point vapor pressure may be utilized as the cathode material.

In operation, the hard vacuum of $10^{-5}$ mm. of mercury or less maintained in the device, made possible by the low vapor pressure of the liquid cathode metal, enables the device to withstand extremely high voltages. When it is desired to fire the device, trigger device 5 is actuated to inject in the form of an electron-ion plasma into the primary gap 12. The plasma injected enables the initiation of the primary discharge by the electric field applied across anode 8 and cathode 9.

The primary discharge continues until the primary voltage drops substantially to zero at which time the discharge ceases. The trigger injection is ended during the primary discharge. Due to the low vapor pressure of the cathode material, the ionized metal vapor which has carried the primary discharge condenses very quickly and eventually returns to the cathode pool. Means are provided in the trigger device 5 to insure quick removal of the injected ions which enabled initiation of the primary discharge. Therefore, since the primary gap 12 very quickly regains the high degree of vacuum it had initially, it can withstand a rapidly following negative voltage without breakdown.

FIGURE 3 shows a detailed vertical cross-section of the trigger device 5 of FIGURE 1. The trigger device 5 comprises ceramic body 14 having a coating 15 of a gas storage metallic material charged with an active gas, for example titanium charged with hydrogen. Other combinations as set forth in my aforementioned patent, 3,087,092 may be used. Other storage materials include Zr, Sc, Yt, Ho, Dy, Lu, and Tm. Trigger gap or groove 16 divides the conductive metallic coating into two positions. Potential is supplied to one side of the trigger gap through cathode 9 and connector 10, while the other side of the trigger potential is applied through trigger lead 1,1 wire 17 and cap 18 to the other portion of the conductive metallic coating. Appropriate ceramic-metal seals at the junction of ceramic body 14 and base disk 4, and between ceramic 14 and supporting ring 19 insure maintenance of the internal vacuum in the device.

Upon application of a trigger pulse of the order of 50–5000 volts from an appropriate source, not shown, field emission causes a breakdown across gap 16 and initiates a trigger discharge. The trigger discharge liberates and ionizes the active gas from the coating 15. Since the trigger discharge effectively forms a closed current loop with wire 17 and coating 15, magnetic forces internal to the loop drive the discharge outwardly from the gap and along the coating. This injects charged particles comprising any electron-ion plasma into primary gap 12 and in addition, initiates a cathode spot on the surface of primary cathode 9. The charged particle plasma injection very quickly enables primary gap 12 to break down under the influence of the electric field applied between primary electrodes 8 and 9. When the primary discharge ends, the gas storage metal eventually absorbs the minute quantity of evolved active gas and the cathode material condenses, thus clearing primary gap 12 within a matter of microseconds.

An advantage of the trigger method of the present invention lies in the fact that the trigger discharge is initiated by field emission and therefore may be accomplished with the application of a relatively low power pulse, for example 50 volts to 5 kilovolts. The trigger voltage may thus be significantly lower than the power required in previous vacuum gap devices, which may range into the 100 kv. range and higher. Furthermore, since the trigger discharge injects a pulse of plasma into the primary gap 12, in addition to forming a cathode spot, the operation of the device is much faster than prior devices which have relied on initiating a cathode spot alone.

The present invention thus concerns an improved triggered vacuum discharge device wherein the improvement lies in enabling the device to operate under alternating current application without rapid erosion of the electrode material by providing a conductive liquid cathode. Furthermore, the device may be used with much higher currents and voltages than previously known devices since the liquid cathode has a low vapor pressure, thereby reducing the internal pressure to avoid the possibility of undesired breakdown. This also facilitates rapid clearing of the primary gap after cessation of the primary discharge. Furthermore, the trigger device of the present invention requires a lower power than previous ignition-type devices and enables faster operation.

While the invention has been described primarily with reference to FIGURE 1 which illustrates a fixed gap with fixed electrodes and a trigger assembly, the principle of use of the low vapor pressure, liquid electrode materials as set forth hereinbefore is equally applicable to a variable gap device such as a vacuum switch. In a triggered gap device the means for supplying the ionized plasma between the gap is the trigger assembly. In a vacuum switch the ionized plasma is supplied by the arc stricken upon circuit breaking. Such a vacuum switch is illustrated in vertical cross-section in FIGURE 4.

In FIGURE 4 an hermetically sealed, evacuable envelope 20 includes cylindrical side wall member 21 and a pair of centrally apertured end plates 22 and 23. A reentrant contact-accommodating cavity assembly 24 surrounds a central aperture in plate 23 and accommodates a fixed contact member 25. An insulating bushing assembly 26 closes the aperture 27 in plate 22 and suspends and supports electrode support member 28 which is terminated in anode electrode 29. A pool 30 of suitable low vapor pressure, low melting point metallic element or alloy fills the lower portion of the envelope cavity and covers cavity 24. The pool constitutes the cathode electrode. A suitably enclosed, as for example, in ceramic, annular soft ferromagnetic substance 31 is enclosed in cover 32 which floats on the surface of pool 30. A suitable exterior magnet 33 may be raised or lowered, as shown by arrows to cause enclosure 32 to be raised or lowered to lower or raise the level of pool 30 to open and close the conductive path between electrodes 29 and 30. It is essential, in this embodiment, that side wall member 21 be of a non-ferromagnetic material, as for example, stainless steel to prevent magnetic shielding. Alternatively a suitable bellows may be incorporated into cavity assembly 24 which may be suitably sized and shaped as to approximately raise and lower the level of pool cathode 30 to make and break contact. Other suitable alternatives may likewise be used; for example the pool may remain at a constant level and a suitable bellows arrangement may be provided for the movement of anode electrode 29.

The specific embodiment described herein is presently merely an example of the various forms the practice of this invention may take. Therefore, it is intended in the appended claims to cover all modifications and variations which come within the true spirit and scope of this invention.

What I claim as new and desire to secure by Letters Patent of the United States is:

1. A vacuum gap discharge device for controlling a kilovolt range alternating voltages and comprising:
   (a) a hermetically sealed envelope at least a portion of which is composed of an insulating dielectric evacuated to a pressure of $10^{-5}$ mm. of Hg or less;
   (b) primary discharge electrodes in said envelope defining a primary discharge gap, one of said electrodes comprising a liquid metal which does not supply conduction carriers to initiate electrical breakdown, said metal being characterized by a melting point vapor pressure of less than $10^{-7}$ mm. of mercury so as to permit the attainment of an equilibrium pressure within said device at equilibrium operating temperature of $10^{-5}$ mm. of Hg or less;
   (c) means for applying a voltage to be controlled to said primary electrodes; and
   (d) trigger means for injecting a breakdown-inducing conductive electron-ion plasma between said primary electrodes to render said primary discharge gap conductive irrespective of the polarity of the voltage applied to said primary electrodes.

2. The device of claim 1 wherein said liquid electrode comprises a metallic material selected from the group consisting of gallium, indium, thallium, tin, lead and alloys thereof.

3. The device of claim 2 wherein said liquid comprises indium, thallium and alloys thereof.

4. The device of claim 1 wherein said means for establishing a conductive plasma between said primary electrodes consist of a trigger electrode assembly adapted to inject an electron-ion plasma into said gap upon receipt of a pulsed voltage thereby irrespective of the polarity of the voltage upon said primary electrodes.

5. The device of claim 4 wherein said trigger assembly comprises a ceramic body having a pair of closely juxtapoesd metallic films upon the surface thereof, said films composed of a metal selected from the group consisting of zirconium, scandium, yttrium, holmium, dysprosium, erbium, lutetium, thulium and adapted to store an active ionizable gas under non-operating conditions at a hard vacuum and to release said gas upon the establishment of a trigger arc between said metallic films.

6. The device of claim 1 including heating means closely juxtaposed to said cathode to maintain the same in the liquid phase.

7. The device of claim 1 wherein one of said primary electrodes is moveable so as to make and break electrical contact with the other of said primary electrodes.

8. The device of claim 7 wherein means are provided to lower and raise the level of said cathode to break and make respectively contact with said anode electrode to provide a circuit interrupting arc therebetween.

9. The device of claim 7 wherein said means comprises a plunger within said envelope magnetically coupled to a magneto-motive device external of said envelope and moveable in response thereto.

(References on following page)

References Cited by the Examiner

UNITED STATES PATENTS

| | | | |
|---|---|---|---|
| 2,189,618 | 2/1940 | Slepian et al. | 315—116 X |
| 2,263,958 | 11/1941 | Strobel | 313—170 X |
| 2,501,292 | 3/1950 | Russell et al. | 313—150 X |
| 2,673,308 | 3/1954 | Herring | 313—170 X |
| 3,002,116 | 9/1961 | Fisher | 313—148 X |
| 3,087,092 | 4/1963 | Lafferty | 313—197 X |

References Cited by the Applicant

UNITED STATES PATENTS

| | | |
|---|---|---|
| 2,069,283 | 2/1937 | Slepian et al. |
| 2,147,506 | 2/1939 | Stoner. |
| 2,474,000 | 6/1949 | Keating. |
| 2,506,763 | 5/1950 | Babler. |
| 3,022,401 | 2/1962 | Wilkerson. |

OTHER REFERENCES

Transactions of the AIEE, 1933, "A New Method for Initiating the Cathode of An Arc," by Slepian et al., vol. 52, page 693.

JAMES W. LAWRENCE, *Primary Examiner.*

C. R. CAMPBELL, *Assistant Examiner.*